July 2, 1963

L. R. JOHNSON 3,095,963

APPARATUS FOR MOVING FOWL

Filed April 21, 1960

INVENTOR
LEONARD R. JOHNSON

BY
ATTORNEY

July 2, 1963  L. R. JOHNSON  3,095,963
APPARATUS FOR MOVING FOWL
Filed April 21, 1960  2 Sheets-Sheet 2
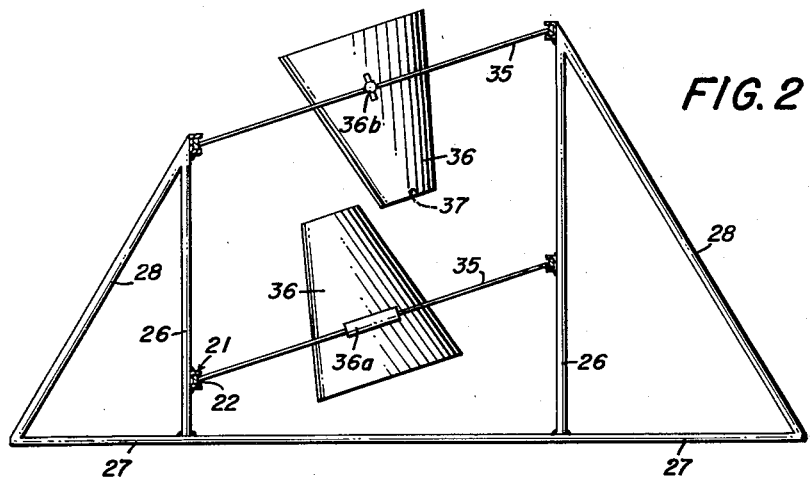
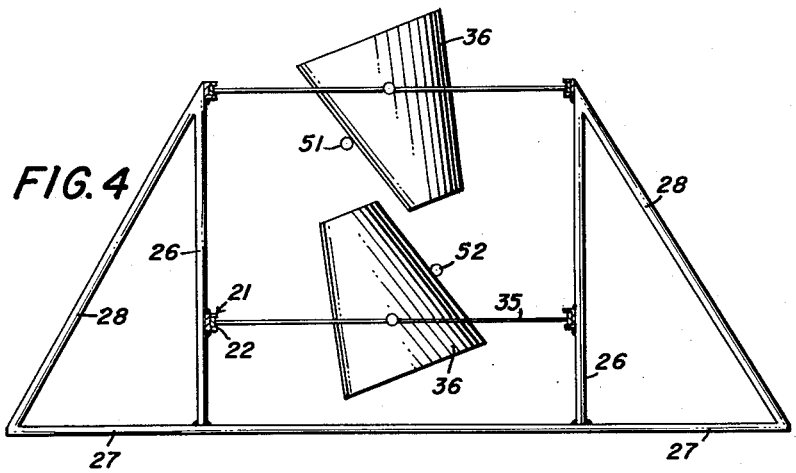
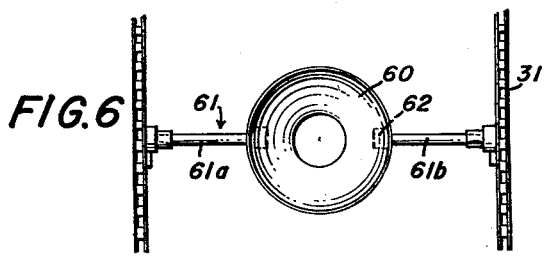
INVENTOR
LEONARD R. JOHNSON
BY
ATTORNEY

United States Patent Office 3,095,963
Patented July 2, 1963

3,095,963
APPARATUS FOR MOVING FOWL
Leonard R. Johnson, 627 S. Capitol, Iowa City, Iowa
Filed Apr. 21, 1960, Ser. No. 23,847
5 Claims. (Cl. 198—148)

This invention relates generally to conveyor apparatus, and more particularly to apparatus for moving live fowl from one location to another location.

While there is shown and described an apparatus for moving the fowl from one level to another level, it is to be understood that the invention is of broader application and can be employed to transport the fowl from one location to another location in the same plane.

It is well known that the transportation of live fowl such as turkeys, chickens, capons and the like from ground level to a truck or other vehicle for packing in crates for shipment is a very difficult, expensive and time consuming operation due to the activity of the fowl and the necessity that care must be exercised not to bruise or otherwise injure the fowl. No practical mechanical means exists for accomplishing such movement of the fowl, and if conveyor means is used, additional components are required to house the fowl thereby increasing the cost of the operation, which does not materially improve the manual loading of the fowl.

Accordingly, an important object of this invention is to provide a conveyor apparatus which overcomes the above and other objectionable characteristics existing in the art and in which means is included to accommodate individual fowl with such means immobilizing the fowl during the course of travel of such means from the entrance to the exit of the conveyor apparatus.

Another object is to provide a conveyor apparatus of the type described wherein the container for receiving the live fowl is so constructed that the fowl may be placed therein with the head of the fowl being in a downward direction at the point of entrance whereby the side wall of the container immobilizes the wings yet when the container reaches the exit, the container rotates through an arc of 180 degrees so that the fowl leaves the container and the conveyor "feet first" for further handling.

A further object of the invention is to provide a conveyor apparatus for live fowl in which a plurality of fowl containers is carried by an endless conveying means with the containers being so supported that the containers of the upper run and those of the lower run are so displaced relative to one another that there can be no contact between the containers during the operation of the apparatus.

Still another object of the invention is to provide a conveyor apparatus for live fowl which is relatively simple in structural detail, positive and efficient in operation and capable of being cheaply and easily manufactured.

Additional objects and advantages of the invention will become more readily apparent from the following specification and attached drawings showing preferred forms of the invention and in which drawings:

FIG. 2 is an end elevational view, partly in cross section showing one form of the container mounting means.

FIG. 4 is a view similar to FIG. 2 of a modified form of mounting means.

FIG. 6 is a plan view of a further mounting means.

Figure 1:
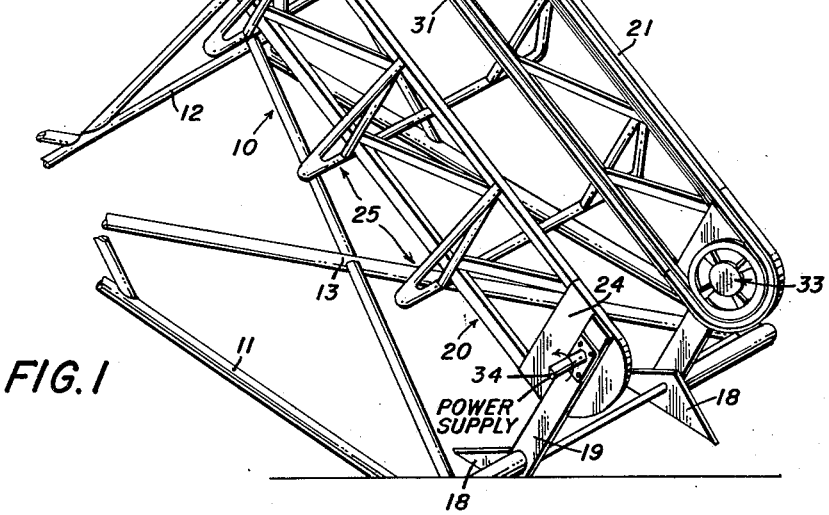
FIG. 1 is a perspective view of the apparatus with the fowl receiving containers being omitted.

As shown in FIG. 1, the conveyor includes a framework 10 preferably of tubular structural components which comprise side members 11, transverse members 12 connected to the side members and an X-shaped reinforcing member 13 suitably secured at its ends to the junctures between the side members and the transverse members. A vertical standard 14 is affixed at its lower end to each of the side members 11 adjacent the connection between such members and the transverse members 12 at one end of the framework and diagonal braces 15 and 16 extend between and are secured to the standards 14 and the side members 11 and transverse members 12, respectively for stabilizing the standards.

Each end of the transverse member 12 adjacent the vertical standards 14 is extended beyond the side members 11 to provide an axle for a rubber tired wheel of any suitable type to allow the framework to be readily and easily moved from place to place.

Mounted on the other transverse 12 is a pair of ground engaging triangular plates 18 and a pair of upstanding elongated plates 19, to each of which plates 19 is suitably affixed one end of side framing elements 20. Each element 20 includes spaced parallel channel bars 21 with the flanges facing inwardly as shown in FIGS. 2 and 4. The flanges define guideways 22 and the respective ends of the bars are connected by an arcuate segment 23 and protected by a plate 24.

Welded or otherwise attached to the outer faces of the respective channel bars 21 are a plurality of spaced apart bracing elements 25. Each element 25 consists of a vertical tubular leg 26 projecting below the lowermost bar 21, a horizontally extending portion 27, a diagonal leg 28 and the portion 27 being common for both of the legs 26 and 28. The uppermost portion or the portion remote from the plates 19 extends outwardly beyond the respective ends of the framing elements 20 and the standards 14 and a cable 29 is secured to such portion in proximity to each end thereof. Each cable passes about a pulley or sheave 30 rotatably mounted on each standard 14 and leads to a winch or equivalent means (not shown) so as to be able to change the angularity of the elements 20 relative to the framework 10 by the operation of the winch.

The guideways 22 and the segments 23 provide tracks for endless transmission means 31 passing about wheels rotatably mounted at each end of the framing elements as shown at 33. Manifestly, if the transmission means 31 is a chain, the wheels will be sprockets while if such means is a V-belt or cable, the wheels will be pulleys or sheaves. One of the axles of the wheels 32, preferably one of the wheels at the front end of the apparatus is extended as shown at 34, with the extended portion 34 being adapted to be suitably connected to a convenient source of power (not shown) so that when the power source is activated, the axle is rotated and consequently, the transmission means 31.

As shown in FIG. 2, the legs 26 of the right hand element 20 are of greater length than those of the other element 20 and the guideways 22 associated with such longer legs are located in planes disposed above the planes of the guideways of the opposite element 20. Furthermore, suitably swingably mounted at each end thereof as at 35', to the endless transmission means 31 are a plurality of equally spaced apart rods 35. A container 36 of generally frusto-conical shape having open ends 37 is connected to a pair of adjacent rods 35. More specifically, one rod passes through a sleeve 36a secured to the wall of the container while the other or adjacent rod passes through an eye 36b on the opposite wall. As can be seen, the smaller ends of the containers of the upper and lower runs of the transmission means 31 project inwardly and due to the angularity of the guideways 22, it is apparent that during movement of the transmission means 31, the containers in the upper run cannot strike the containers of the lower run moving in the opposite direction.

It is to be further understood that the containers may be of other shapes, such as triangles, octagons, et cetera so long as the walls taper.

To use the conveyor, and assuming live turkeys are to be loaded onto a truck, the apparatus is wheeled to a position at the rear of the truck and the angularity of the side elements is adjusted by the manipulation of the cables 29 until the upper end of the conveyor is located the proper distance above the rear of the truck. The endless transmission means is next placed in operation by driving the shaft portion 34 from the power source and a live turkey is placed head down in the container of the upper run which is most convenient at the time. By thus placing the turkey, the wings will be held by the side wall of the container thereby immobilizing the bird and when such container reaches the upper end of the conveyor and starts to pass downwardly about the upper wheels 32, the large end of the container will be directed downwardly thus discharging the turkey "feet first" into the truck for further handling by the employees in the truck. Of course, it is to be understood that the operator at ground level places a turkey in each container as it moves past his station and the speed of movement of the transmission means 31 can be regulated to suit the conditions encountered.

Instead of arranging the rods 35 as shown in FIG. 2, the vertical legs may be of the same length as illustrated in FIG. 4 with each of the guideways 22 being in the same plane. In this form, the container is pivoted between adjacent rods 35 by means of short shafts 50 carried by the container being rotatably mounted in sleeves affixed to the shafts. Guide rails 51 and 52 extend longitudinally of the apparatus in spaced relation to the upper and lower runs of the endless transmission means 31. Each end of each rail 51 and 52 is provided with a perpendicular portion extending outwardly therefrom for convenient attachment to the side framing elements to support the rails on the apparatus. The rails maintain the proper angularity of the containers as is clear from FIG. 4 but otherwise, this form functions in the same manner as the FIG. 2 assembly.

Figure 5:
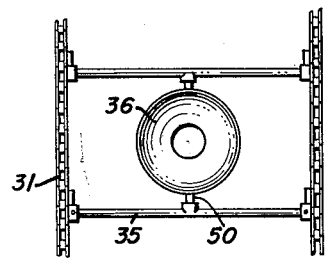
FIG. 5 is a plan view of the FIG. 4 showing.
Figure 3:
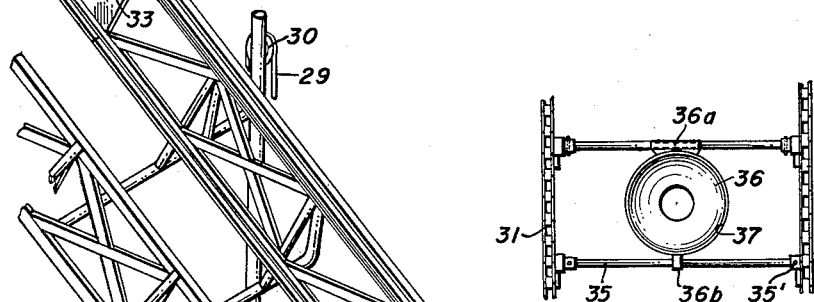
FIG. 3 is a plan view of the showing of FIG. 2.

In FIG. 5, there is shown an arrangement whereby the containers are mounted for free swinging or pivotal movement on the transmission means. To accomplish this end, a container 60 is carried by each cross rod 61 and such rod includes sections 61a and 61b. The free or inner ends of the sections 61a and 61b are mounted in sockets 62 provided at diametrically opposite points on the wall of the container. Hence, the containers may swing freely with respect to the cross rods and thus the side framing elements of the conveyor.

It will be appreciated from the foregoing description that the turkeys have a minimum of manual handling and it is unnecessary to tie or otherwise immobilize the fowl for its movement to the truck and thus the operation can be easily and quickly effected with a minimum of personnel. Also, by reason of the arrangement of the containers, there is no danger of the heads of the fowl extending downwardly through the smaller ends of the containers being struck by the ends of the empty containers of the lower run which are moving in the opposite direction since the containers are spaced to clear each other during operation.

It will be further appreciated that the apparatus may be used in a substantially horizontal plane if it is desired to move fowl from, for example a loading platform to a location within a store or processing plant. Hence, the apparatus is highly flexible as to its ultimate uses and may be employed in all situations where it is desired to move the fowl from one place to another.

The invention is not to be confined to any strict conformity to the showings in the drawings but changes or modifications may be made therein so long as such changes or modifications mark no material departure from the spirit and scope of the appended claims.

I claim:

1. In an apparatus for moving fowl from one location to another location, frame means, guideways on the frame means extending longitudinally thereof to define upper and lower runs, endless transmission means adapted for movement in the guideways, longitudinally spaced open ended containers carried by the transmission means for free swinging movement transverse to the path of travel of the transmission means with each container being adapted to contain a fowl, means associated with the frame means and the containers for spacing the containers in the upper and lower runs apart during movement of the transmission means, and means for imparting movement to the transmission means.

2. The apparatus as claimed in claim 1 in which the frame means includes a pair of spaced parallel side elements, the guideways being mounted on each element with the guideways being in different planes, and each container being carried by a pair of cross rods secured at their ends to the endless transmission means and intermediate their ends to the container.

3. The apparatus as claimed in claim 1 in which the frame means includes a pair of spaced parallel side elements, the guideways being mounted on each element and in the same planes, each container being carried by a pair of cross rods secured at their ends to the endless transmission means and intermediate their ends to the container, and guide bars extending longitudinally of the frame means adjacent the upper and lower runs for engaging the inner side of each container in each of the runs.

4. The apparatus as claimed in claim 1 in which the container comprises a frusto-conical body with the smaller open end being directed inwardly of the frame means so that when a fowl is placed into a container in the upper run, the heads extends through the smaller open end and when such container moves into the lower run, the fowl is discharged feet first from the container.

5. The apparatus as claimed in claim 1 further including a framework for the frame means and means pivotally connecting the frame means to the framework so that the angular position of the frame means relative to the framework can be varied.

References Cited in the file of this patent

UNITED STATES PATENTS

| | | |
|---|---|---|
| 264,387 | Whipple | Sept. 12, 1882 |
| 2,570,143 | Merrick | Oct. 2, 1951 |
| 2,919,792 | Kirkhart | Jan. 5, 1960 |